(12) United States Patent
Dole et al.

(10) Patent No.: US 8,177,263 B2
(45) Date of Patent: May 15, 2012

(54) PIPE COUPLING HAVING MOVABLE GRIPPING BODIES

(75) Inventors: Douglas R. Dole, Whitehouse Station, NJ (US); Michael V. Porter, Easton, PA (US); Torrey G. Sipos, Catasauqua, PA (US)

(73) Assignee: Victaulic Company, Easton, PA (US)

( * ) Notice: Subject to any disclaimer, the term of this patent is extended or adjusted under 35 U.S.C. 154(b) by 0 days.

(21) Appl. No.: 13/113,124

(22) Filed: May 23, 2011

(65) Prior Publication Data

US 2011/0221189 A1    Sep. 15, 2011

Related U.S. Application Data

(62) Division of application No. 12/119,661, filed on May 13, 2008, now Pat. No. 7,950,701.

(60) Provisional application No. 60/938,003, filed on May 15, 2007.

(51) Int. Cl.
*F16L 23/00* (2006.01)

(52) U.S. Cl. ........ 285/367; 285/253; 285/368; 285/411; 285/412; 285/420

(58) Field of Classification Search .......... 285/252–253, 285/364–368, 411–413, 419–420
See application file for complete search history.

(56) References Cited

U.S. PATENT DOCUMENTS

| | | |
|---|---|---|
| 591,796 A | 10/1897 | De Wolf |
| 711,946 A | 10/1902 | Day |
| 1,004,634 A | 10/1911 | Dixon |
| 1,532,596 A | 4/1925 | Madsen |
| 1,662,954 A | 3/1928 | Broido |
| 1,930,194 A | 10/1933 | Dillon |
| 2,028,182 A | 1/1936 | Barnickol, Jr. |
| 2,473,046 A | 6/1949 | Adams, Jr. |
| 2,512,741 A | 6/1950 | Goodall |
| 3,003,793 A | 10/1961 | Pitt |
| 3,078,108 A | 2/1963 | Smith |
| 3,116,078 A | 12/1963 | Scherer |
| 3,249,371 A | 5/1966 | Peterman |
| 3,329,446 A | 7/1967 | Katis |
| 4,417,755 A | 11/1983 | Gittleman |

(Continued)

FOREIGN PATENT DOCUMENTS

TW    I250054    3/2006

(Continued)

OTHER PUBLICATIONS

Author Unknown, Search Report for Patent Application; from corresponding Taiwan patent application No. 100104195; Sep. 7, 2011, pp. 1-4: Taiwan Patent Office.

(Continued)

*Primary Examiner* — Aaron Dunwoody
*Assistant Examiner* — Fannie Kee
(74) *Attorney, Agent, or Firm* — Ballard Spahr LLP

(57) ABSTRACT

A coupling for securing pipe elements together in end-to-end relation has segments joined end-to-end by adjustable connection members. The segments surround a central space which receives the pipe elements. One or more gripping bodies are captured between the segments. The gripping bodies are arranged opposite to each other. The segments have angularly oriented reaction surfaces on the connection members. The gripping bodies have angularly oriented contact surfaces which interface with the reaction surfaces. When the segments are drawn toward each other by the connection members, interaction between the reaction surfaces and the contact surfaces forces the gripping bodies radially inwardly. Inwardly facing arcuate surfaces on the segments and the gripping bodies engage and retain the pipe elements.

18 Claims, 14 Drawing Sheets

U.S. PATENT DOCUMENTS

| | | |
|---|---|---|
| 4,438,954 A | 3/1984 | Hattori |
| 4,611,835 A | 9/1986 | Gittleman |
| 4,611,839 A | 9/1986 | Rung et al. |
| 4,639,020 A | 1/1987 | Rung et al. |
| 4,729,582 A | 3/1988 | Zeidler |
| 5,037,141 A | 8/1991 | Jardine |
| 5,058,931 A | 10/1991 | Bowsher |
| 5,121,946 A | 6/1992 | Jardine |
| 5,161,836 A | 11/1992 | McKinnon |
| 5,188,401 A | 2/1993 | Staniforth |
| 5,605,357 A | 2/1997 | Bird |
| 5,722,701 A | 3/1998 | Choi |
| 5,758,907 A | 6/1998 | Dole et al. |
| 5,772,253 A | 6/1998 | Hodge et al. |
| 6,367,849 B1 | 4/2002 | Tatsuta et al. |
| 6,499,771 B1 | 12/2002 | Snyder, Sr. et al. |
| 7,086,131 B2 | 8/2006 | Gibb et al. |
| 7,390,026 B2 | 6/2008 | Noda |
| 7,401,819 B2 | 7/2008 | Gibb et al. |
| 2005/0104369 A1 | 5/2005 | Webb et al. |
| 2005/0258641 A1 | 11/2005 | Gibb |

FOREIGN PATENT DOCUMENTS

| | | |
|---|---|---|
| WO | 2008144332 A1 | 11/2008 |

OTHER PUBLICATIONS

Author Unknown, Translation of Search Report: from corresponding Taiwan patent application No. 100104195; Sep. 7, 2011; 1 page; Taiwan Patent Office.

Dauvergne, Bertrand; Supplemental European Search Report from corresponding European Patent Application No. EP 08755442.4; European Patent Office; Apr. 6, 2010; pp. 1-7.

Kee, Fannie C.; Non-Final Office Action from related U.S. Appl. No. 12/119,661; United States Patent and Trademark Office, Aug. 3, 2010; pp. 1-20.

Kee, Fannie C.; Non-Final Office Action from related U.S. Appl. No. 12/199,661; United States Patent and Trademark Office; Jan. 20, 2011; pp. 1-11.

Kee, Fannie C.; Interview Summary from related U.S. Appl. No. 12/199,661; United States Patent and Trademark Office, Feb. 3, 2011.

Fee, Fannie C.; Notice of Allowance from related U.S. Appl. No. 12/119,661; United States Patent and Trademark Office; Apr. 18, 2011, pp. 1-11.

Santella, Lena; Examiners Report from related Canadian Patent Application No. 2,686,708; Canadian Intellectual Property Office; Apr. 11, 2011; pp. 1-17.

Young, Lee W., PCT Written Opinion of the International Searching Authority from corresponding PCT Application No. PCT/US08/63587; United States Patent and Trademark Office, ISA/US; Sep. 15, 2008; pp. 1-7.

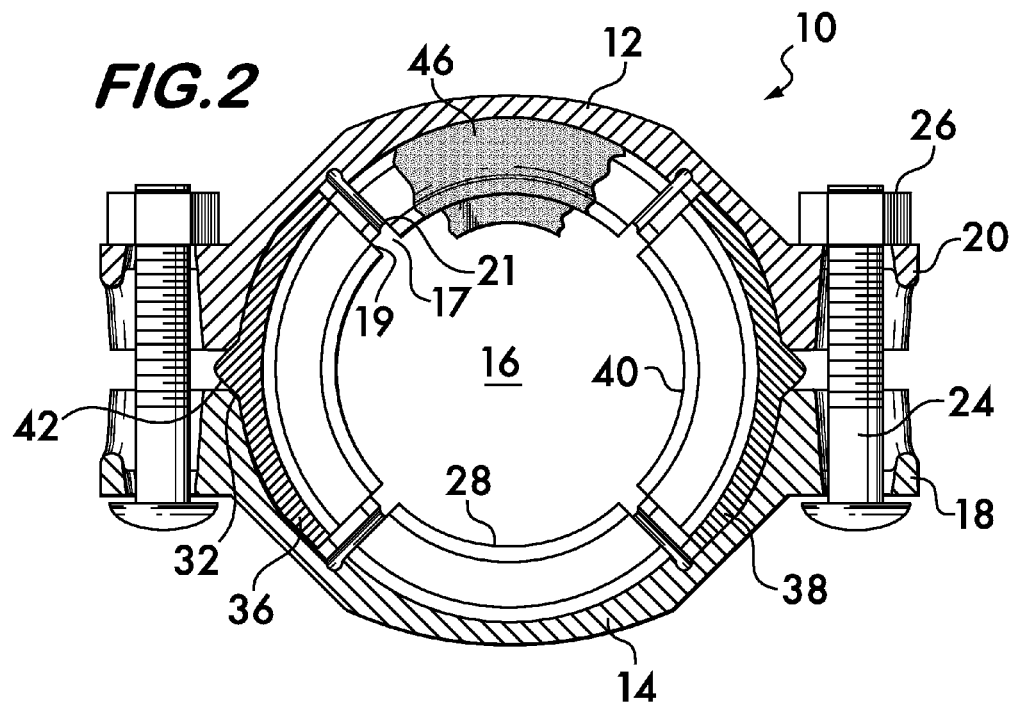
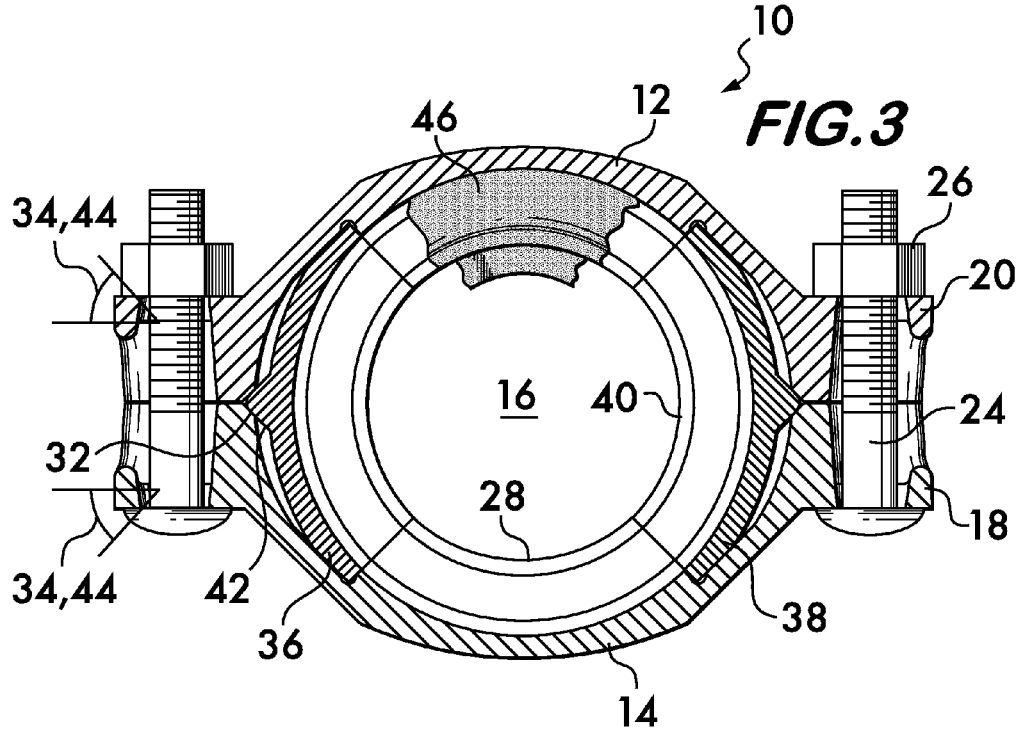

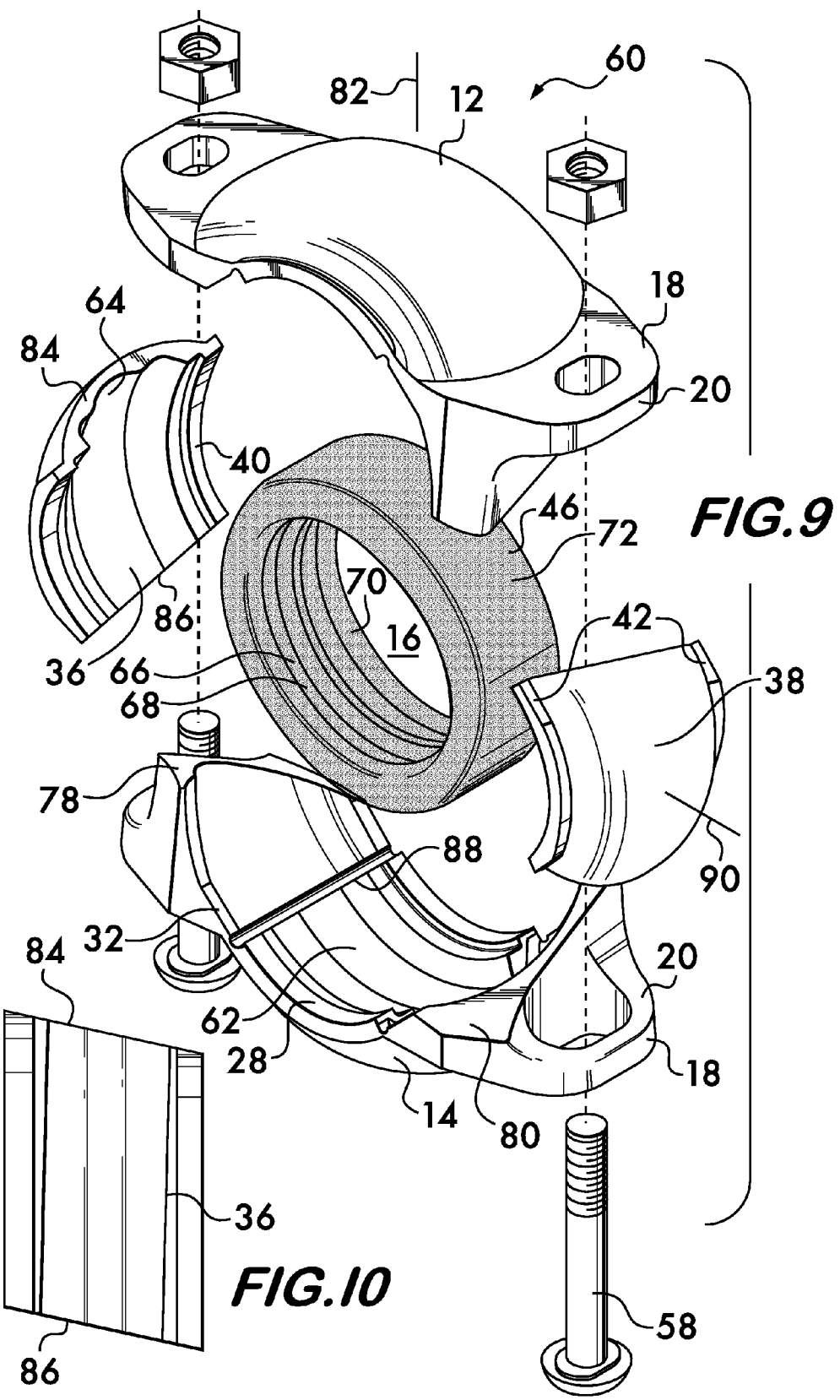

PIPE COUPLING HAVING MOVABLE GRIPPING BODIES

CROSS-REFERENCE TO RELATED APPLICATION

This application is a divisional of U.S. patent application Ser. No. 12/119,661 filed May 13, 2008, which is based on and claims priority to U.S. Provisional Patent Application No. 60/938,003, filed May 15, 2007.

FIELD OF THE INVENTION

This invention relates to couplings for joining pipe elements in end-to-end relationship.

BACKGROUND OF THE INVENTION

Mechanical couplings for joining pipe elements end-to-end find widespread use throughout a broad spectrum of industries such as the chemical industry, the petroleum industry and mining, as well as in municipal water service and fire suppression systems for buildings and other structures.

An example of a prior art coupling currently in use is provided in U.S. Pat. No. 7,086,131, which discloses a coupling having a pair of coupling segments joined end-to-end by fasteners received in lugs at each end of the segments. A sealing member is positioned between the segments. The coupling is pre-assembled at the factory. The segments are designed and sized to receive pipe elements in the field which are inserted directly between the coupling segments in the pre-assembled state, without the need to disassemble and reassemble the coupling. After insertion of the pipe elements, the fasteners are tightened to effect a fluid-tight, mechanically restrained joint between the pipe elements.

While it is advantageous to pre-assemble such couplings because it saves time and thereby cost during construction, power tools are often used to tighten the fasteners for convenience, as they are faster and less fatiguing. Power tools are of limited value, however, where no source of electrical power or compressed air is available, even those tools which are battery operated. Furthermore, power tools which cause electrical sparking may not be used in environments, such as mines, where explosive conditions may exist. It would be advantageous to provide a pipe coupling which can be pre-assembled (and thereby secure the cost advantages and convenience of such couplings) while being easily manually tightened by workmen installing the couplings. It is further advantageous to decrease the stiffness of the joint formed by the coupling for certain applications. This can be accomplished by employing couplings according to the invention.

SUMMARY OF THE INVENTION

The invention concerns a pipe coupling for securing end portions of a pair of pipe elements together end-to-end. In one embodiment, the coupling comprises a plurality of segments connectable end-to-end surrounding a central space for receiving the pipe elements. Each segment has a pair of arcuate surfaces positioned in spaced relation, the arcuate surfaces facing the central space and being engagable with the pipe elements. Connection members are positioned at opposite ends of each of the segments for adjustably connecting the segments to one another. The connection members are adjustably tightenable for drawing the segments toward one another and into engagement with the pipe elements. Respective reaction surfaces are positioned on at least two of the connection members which face one another. The reaction surfaces face the central space. At least one gripping body is positioned between two of the segments. The gripping body has a pair of gripping surfaces positioned in spaced apart relation. The gripping surfaces face the central space for engagement with the pipe elements. A first pair of contact surfaces is positioned on the gripping body in facing relation with the reaction surfaces. Adjustable tightening of the connection members draws the coupling segments together. The contact surfaces interact with the reaction surfaces to move the gripping body into the central space for engagement of the gripping surfaces with the pipe elements.

In one embodiment, the reaction surfaces are angularly oriented with respect to the projections. Orientation angles for the reaction surfaces from about 30° to about 60° are feasible, with 45° being preferred. Alternately, the reaction surfaces may have a convex shape. The contact surfaces may also angularly oriented with respect to the projections. Orientation angles for the contact surfaces from about 30° to about 60° are feasible, with 45° being preferred. Alternately, the contact surfaces may have a convex shape.

In one embodiment of the coupling, the contact surfaces project radially outwardly away from the central space. In another embodiment, the gripping bodies have a second pair of contact surfaces. The first and second pairs of contact surfaces are positioned on opposite sides of the gripping body.

In another embodiment, the coupling comprises a plurality of segments connectable end-to-end surrounding a central space for receiving the pipe elements. Each segment has a pair of arcuate surfaces in spaced relation. The arcuate surfaces face the central space and are engagable with the pipe elements. Connection members are positioned at opposite ends of each of the segments for adjustably connecting the segments to one another. The connection members are adjustably tightenable for drawing the coupling segments toward one another and into engagement with the pipe elements. First and second reaction surfaces are positioned at opposite ends of each coupling segment in spaced relation. The reaction surfaces face the central space. First and second gripping bodies are positioned between the segments at opposite ends thereof. Each of the gripping bodies has a pair of gripping surfaces positioned in spaced relation to each other. The gripping surfaces face the central space and are engagable with the pipe elements. Each of the gripping bodies has a plurality of contact surfaces positioned in spaced relation. Each of the contact surfaces is engaged with one of the reaction surfaces of the segments. Each of the gripping bodies has end faces positioned opposite to one another. The segments have inwardly projecting shoulders positioned adjacent to the reaction surfaces. The shoulders are engagable with the end faces. Either the end faces or the shoulders or both are angularly oriented so as to cause rotation of the gripping bodies about an axis substantially perpendicular to the pipe elements when the coupling segments are drawn together. Adjustable tightening of the connection members draws the coupling segments together. The contact surfaces interact with the reaction surfaces to move the gripping bodies radially inwardly for engagement of the gripping surfaces with the pipe elements.

In one embodiment, the reaction surfaces extend in a tangential direction of the segments. In another embodiment, the gripping bodies comprise a channel adapted to receive a sealing member. The channel is skewed relatively to the gripping surfaces so as to substantially align with the sealing member upon rotation of the gripping bodies.

Another embodiment of the pipe coupling according to the invention comprises a plurality of segments connectable endto-end. The segments surround a central space. Each segment has first and second arcuate grooves in spaced relation facing the central space. Connection members are positioned at opposite ends of each of the segments for adjustably connecting the segments to one another. The connection members are adjustably tightenable for drawing the segments toward one another. First and second reaction surfaces are positioned at opposite ends of each coupling segment in spaced relation to one another. The reaction surfaces face the central space. First and second gripping bodies are positioned between the segments at opposite ends thereof. Each of the gripping bodies has first and second arcuate grooves positioned in spaced relation. The grooves face the central space. Each of the gripping bodies has a plurality of contact surfaces positioned in facing relation with the reaction surfaces. Each of the contact surfaces is engaged with one of the reaction surfaces on each of the segments. First and second retainers are received within the grooves of the couplings. Each of the retainers comprises an annular band having a plurality of teeth extending radially inwardly. Each annular band is split so as to permit radial motion of the teeth when the band is radially compressed. The first retainer is received within the first grooves in the coupling segments and the gripping bodies and the second retainer is received within the second grooves in the coupling segments and the gripping bodies. The teeth of the first retainer are angularly oriented toward the teeth of the second retainer, and the teeth of the second retainer are angularly oriented toward the teeth of the first retainer. Adjustable tightening of the connection members draws the coupling segments together. The contact surfaces interact with the reaction surfaces to move the gripping bodies radially inwardly for compressing the retainers into engagement with the pipe elements. Preferably, the reaction surfaces extend in a tangential direction of the segments.

BRIEF DESCRIPTION OF THE DRAWINGS

FIGS. 2 and 3 are cross-sectional views of the coupling shown in FIG. 1;

FIG. 9 is an isometric exploded view of another coupling embodiment according to the invention;

FIG. 10 is a front view of a component of the coupling shown in FIG. 9;

DETAILED DESCRIPTION OF THE EMBODIMENTS

Figure 1:
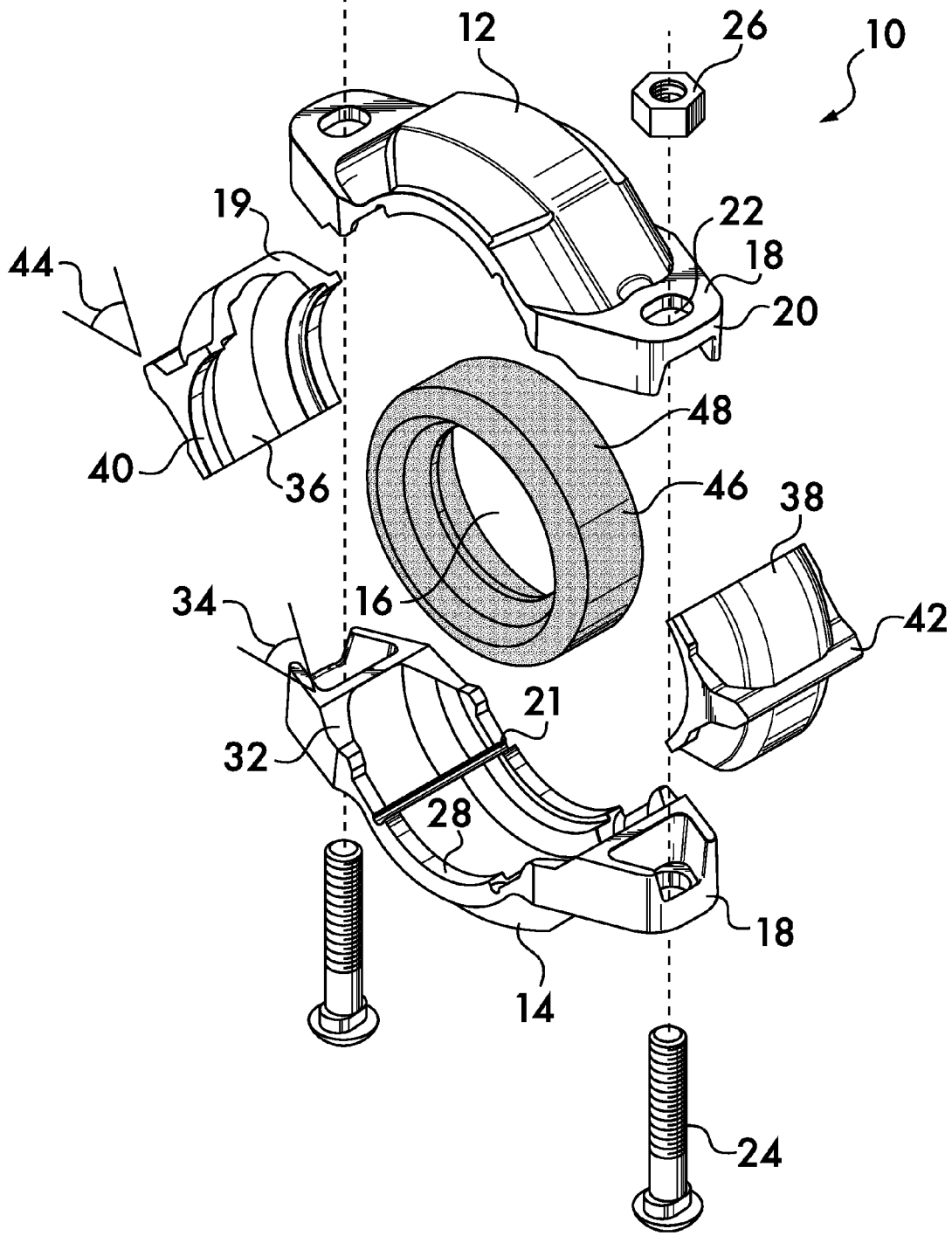
FIG. 1 is an exploded isometric view of an embodiment of a coupling according to the invention.

FIG. 1 shows an exploded isometric view of a coupling embodiment 10 according to the invention. Coupling 10 comprises a plurality of segments 12 and 14. Segments 12 and 14 are connectable end-to-end to surround a central space 16. Connection of the segments is effected by connection members 18 positioned at opposite ends of each of the segments 12 and 14. In this embodiment, the connection members comprise projections 20 which extend outwardly from the ends of the segments. Projections 20 have apertures 22 adapting them to receive fasteners, such as bolts 24 and nuts 26. The fasteners are adjustably tightenable and cooperate with the projections 20 for drawing the segments 12 and 14 toward the central space 16 upon tightening.

Figure 4:
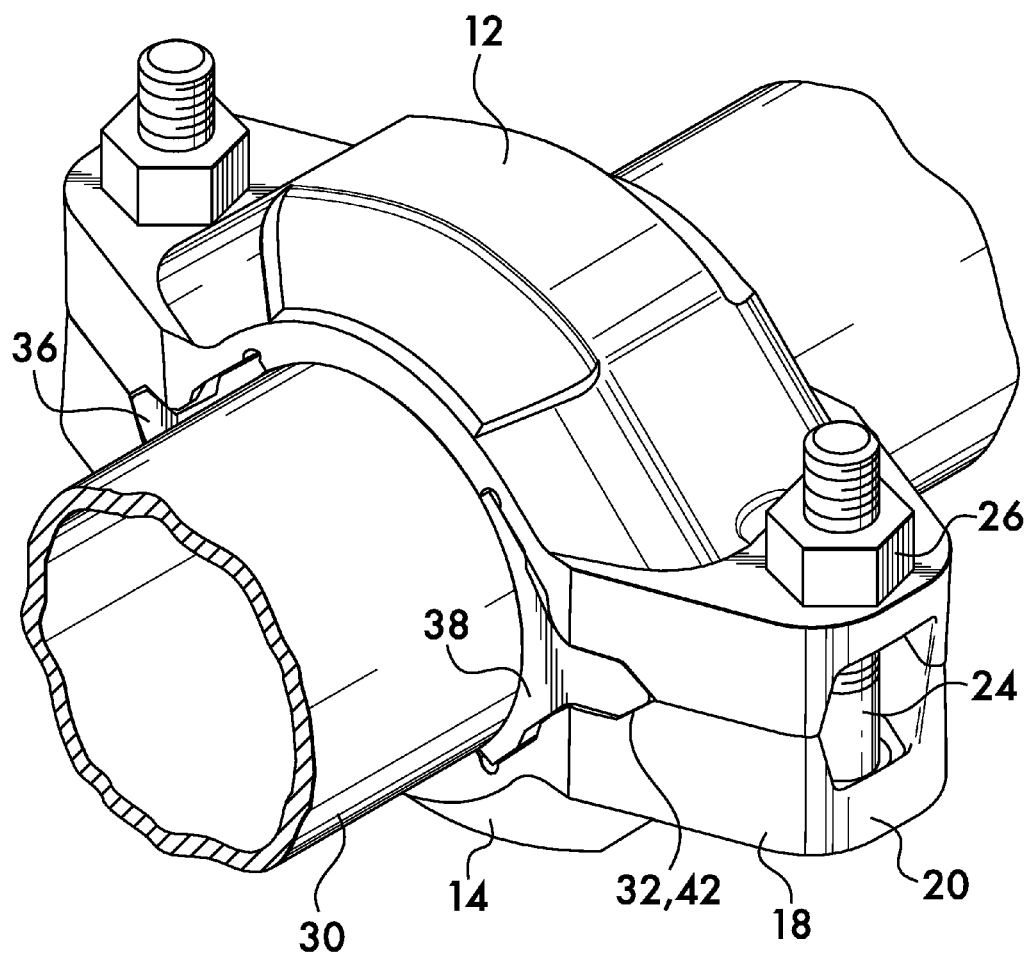
FIG. 4 is an isometric view of the coupling shown in FIG. 1.

Each segment has a pair of arcuate surfaces 28. Surfaces 28 are positioned in spaced relation to one another and face the central space 16. The arcuate surfaces engage and retain pipe elements 30 (see FIG. 4) when the fasteners connecting projections 20 are tightened to draw the segments toward each other. The arcuate surfaces may engage circumferential grooves in the pipe elements, plain ended pipe elements, flared end pipe elements or pipe ends having a shoulder.

Each segment also has at least one, but preferably a plurality of, reaction surfaces 32 positioned on the connection members 18. In the embodiment shown in FIG. 1, two reaction surfaces 32 are positioned on each projection 20. The reaction surfaces are angularly oriented with respect to the projections, and may have an orientation angle 34 from about 30° to about 60° and are inclined so as to face the central space 16. Orientation angles of about 45° are preferred as explained below.

Coupling 10 also comprises one or more gripping bodies. In the example embodiment, two gripping bodies 36 and 38 are positioned between the segments 12 and 14 opposite to one another. Each gripping body has a pair of gripping surfaces 40. Similar to the arcuate surfaces 28, the gripping surfaces are positioned in spaced apart relation and face the central space 16. Each gripping body has a pair of contact surfaces 42 positioned in facing relation with the reaction surfaces 32 on the projections 20 of the segments 12 and 14. The contact surfaces are also angularly oriented with respect to the projections, and may have an orientation angle 44 from about 30° to about 60°. Orientation angles of about 45° are preferred as explained below. Preferably, the orientation angles 34 and 44 are complementary to one another, meaning that they have approximately the same angular orientation.

Upon assembly of the coupling 10, a seal 46 is captured within the central space 16 by the segments 12 and 14 and the gripping bodies 36. Seal 46 ensures that the coupling 10 provides a fluid-tight joint between pipe ends. The seal 46 is sized so that, in an undeformed state, its outer circumference 48 supports the segments 12 and 14 and the gripping bodies 36 and 38 in spaced apart relation sufficient for pipe elements to be inserted into the central space 16 without disassembling the coupling.

Operation of the coupling is described with reference to FIGS. 2 and 3. FIG. 2 shows the coupling 10 as received from the factory in the pre-assembled state, installation ready. In this configuration, the fasteners are not yet tightened, thereby allowing the segments 12 and 14 and the gripping bodies 36 and 38 to be positioned radially outwardly away from the central space 16 to allow pipe elements (not shown for clarity)

to be inserted into the central space. As noted above, the seal 46 is sized to hold the segments and gripping bodies radially outwardly to facilitate pipe insertion. Upon insertion, the pipe elements engage the seal 46 which provides fluid tightness to the joint. Next, the bolts 24 and nuts 26 are tightened, drawing the segments 12 and 14 toward one another and the central space 16. As the segments move, the arcuate surfaces 28 are brought into engagement with the outer surface of the pipe elements to retain them in the coupling. As shown in FIG. 3, motion of the segments 12 and 14 toward one another causes the gripping bodies 36 and 38 to move inwardly toward the central space 16, in a direction substantially perpendicular to the motion of the segments. This permits the gripping surfaces 40 on the gripping bodies 36 and 38 to also engage the outer surface of the pipe elements. Motion of the gripping bodies toward the central space 16 is effected by the interaction of the contact surfaces 42 on the gripping bodies with the reaction surfaces 32 on the projections 20. The angular orientation 44 and 34 of the contact surfaces and the reaction surfaces respectively, allows the forces between the surfaces to be resolved into a component directed toward the central space. This force, applied at the contact surfaces, causes the motion of the gripping bodies toward the central space. As noted above, orientation angles of about 45° are preferred for both the reaction surfaces and the contact surfaces. The 45° angles ensure that, during the motion of the segments 12 and 14 and the gripping bodies 36 and 38 toward the central space 16, the arcuate surfaces 28 and the gripping surfaces 40 are at all times equidistant from the pipe elements 30 and contact the pipe elements substantially simultaneously.

As shown in FIG. 2, there are multiple gaps 17 between the end faces 19 of the gripping bodies 36, 38, and shoulders 21 on segments 12 and 14. The gaps 17 allow for the relative motion between the gripping bodes and the segments. The gaps are about one half the size of gaps between segments in prior art couplings and consequently the gripping bodies and segments have less tendency to pinch the seal 46 as the gaps 17 close to virtually line on line contact as shown in FIG. 3. This results in more uniform compression of seal 46 and the elimination of extrusion paths for the seal when under pressure.

It is advantageous to position the reaction surfaces 32 on the projections 20 and have the contact surfaces 42 project substantially radially outwardly away from the central space 16 so that the interface between the contact surfaces and the reaction surfaces is near the fastener (bolt 24, nut 26) which joins the connections members 18 (in this example projections 20) to one another. Internal pressure within the coupling 10, acting on the seal 46, will force the segments 12 and 14 and the gripping bodies 36 and 38 away from the central space. Force applied to the gripping bodies within the coupling is transmitted to the segments at the interface between the contact surfaces 42 and the reaction surfaces 32. Due to their angular orientation, the contact surfaces will tend to act like a wedge and force the projections 20 apart. By placing the interface close to the fastener joining the projections, the separation of the projections will be less than if the interface were farther from the fastener. The advantageous positioning of the contact surface-reaction surface interface minimizes the separation of the segments and allows the coupling to withstand higher pressures without leaking. Furthermore, by placing the reaction forces between the segments and the gripping bodies near the fasteners the distortion of the segments by the gripping bodies is lessened and the coupling better maintains its round shape.

Figure 4A:
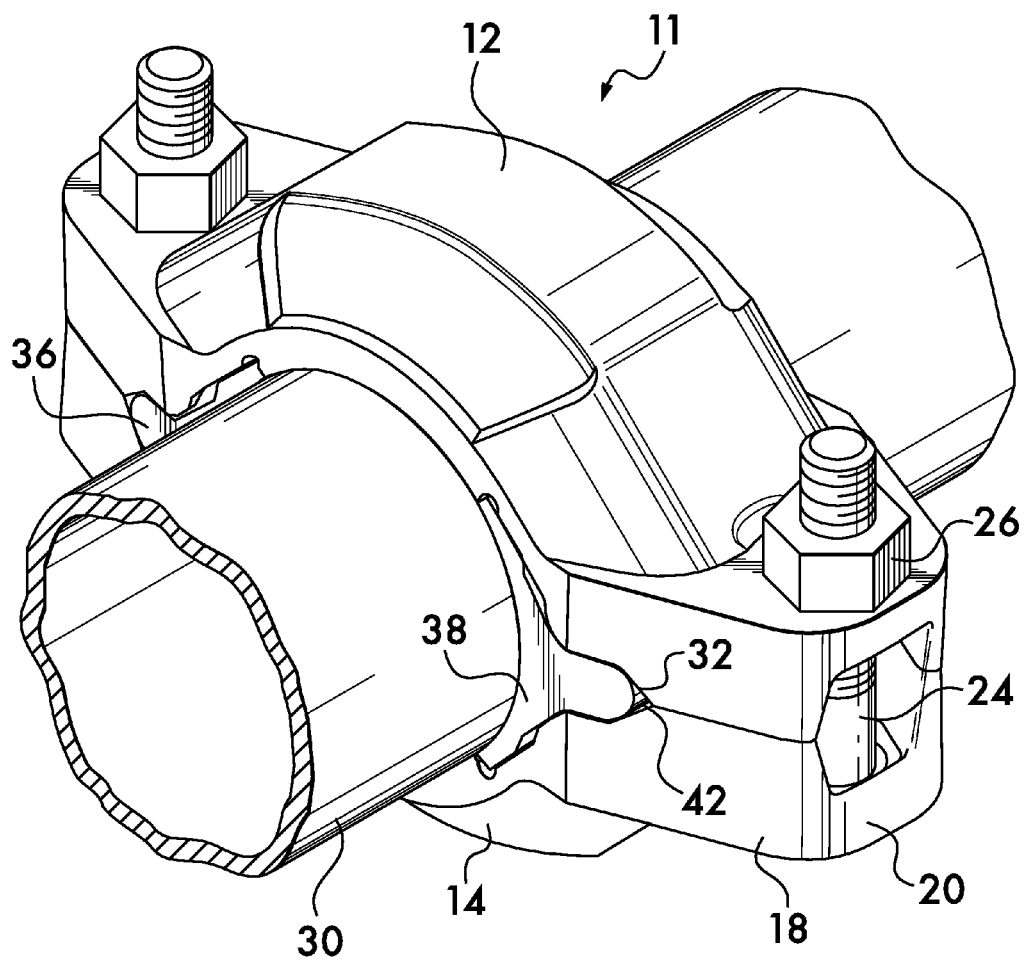
FIGS. 4A and 4B are isometric views of alternate embodiments of a coupling according to the invention.
Figure 4B:
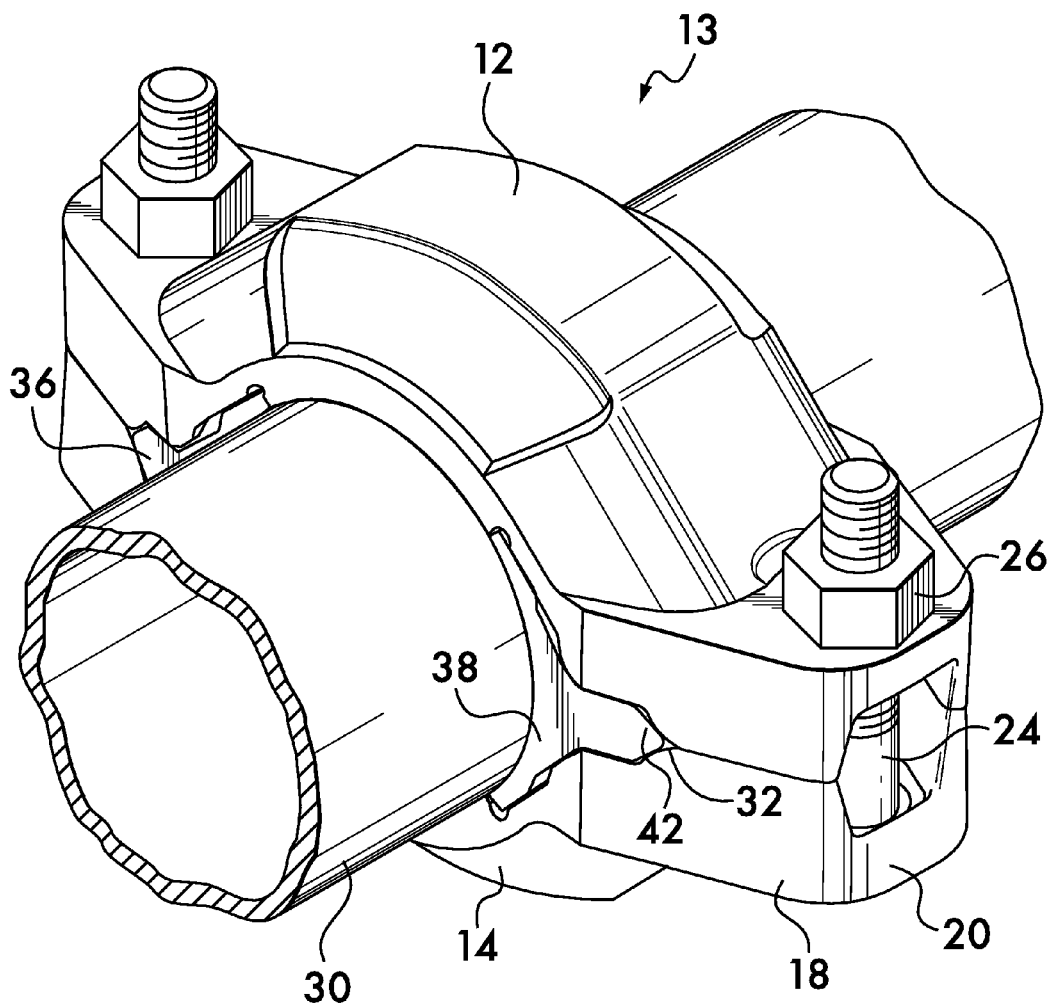

FIG. 4A illustrates another embodiment 11 of a coupling according to the invention. In this embodiment, the contact surfaces 42 on the gripping bodies 36 and 38 have a convex shape. This permits them to engage the reaction surfaces 32 tangentially when the segments 12 and 14 are drawn toward one another, resulting in reaction forces which cause motion of the gripping bodies toward the central space. The reaction surfaces 32 are angularly oriented. FIG. 4B shows another embodiment 13 wherein the reaction surfaces 32 have a convex shape and the contact surfaces 42 are angularly oriented. This again allows for tangential engagement between the reaction surfaces and the contact surfaces, resulting in reaction forces which cause motion of the gripping bodies toward the central space as the segments 12 and 14 are drawn toward each other.

Figure 5:
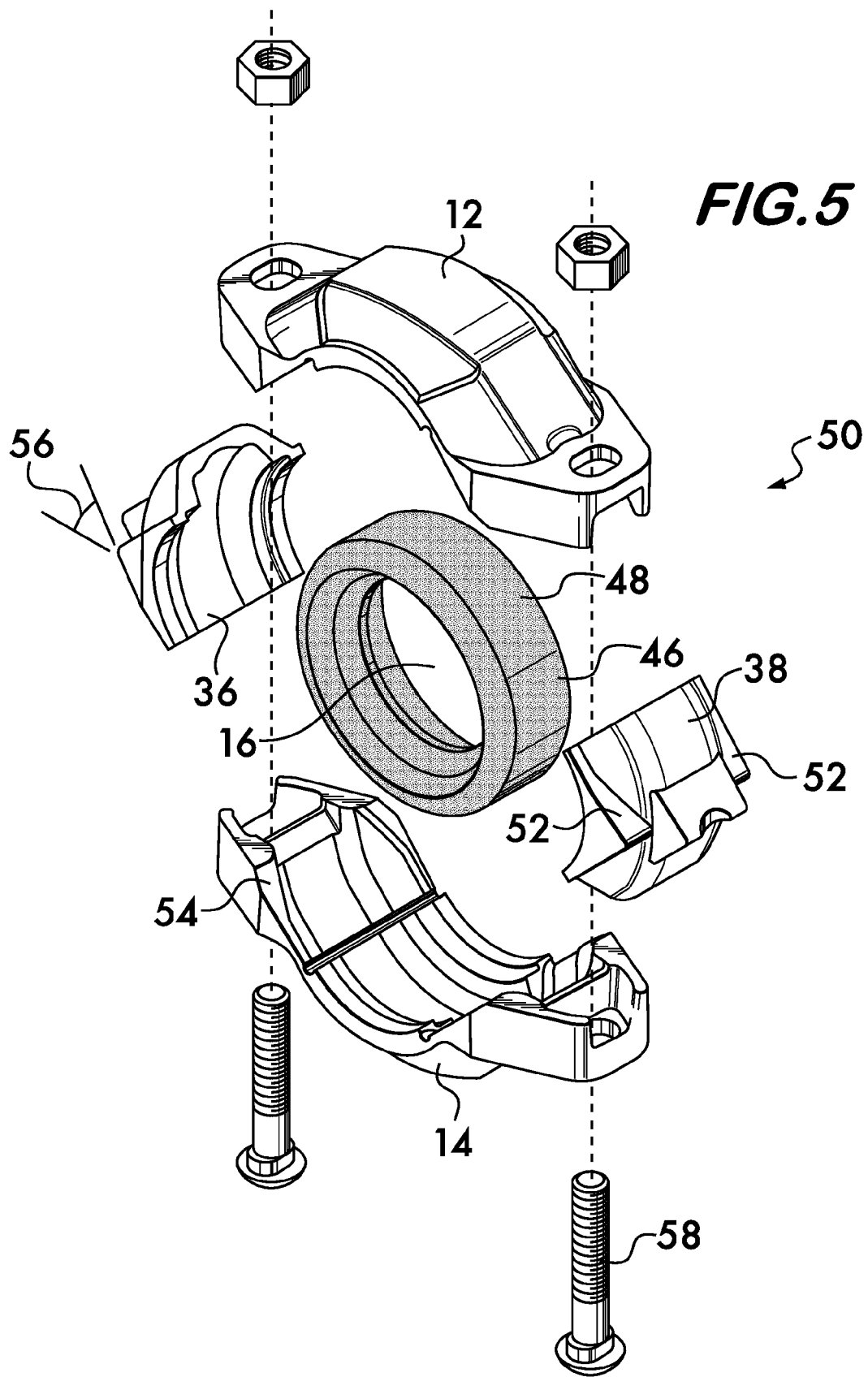
FIG. 5 is an exploded isometric view of another embodiment of a coupling according to the invention.
Figure 8:
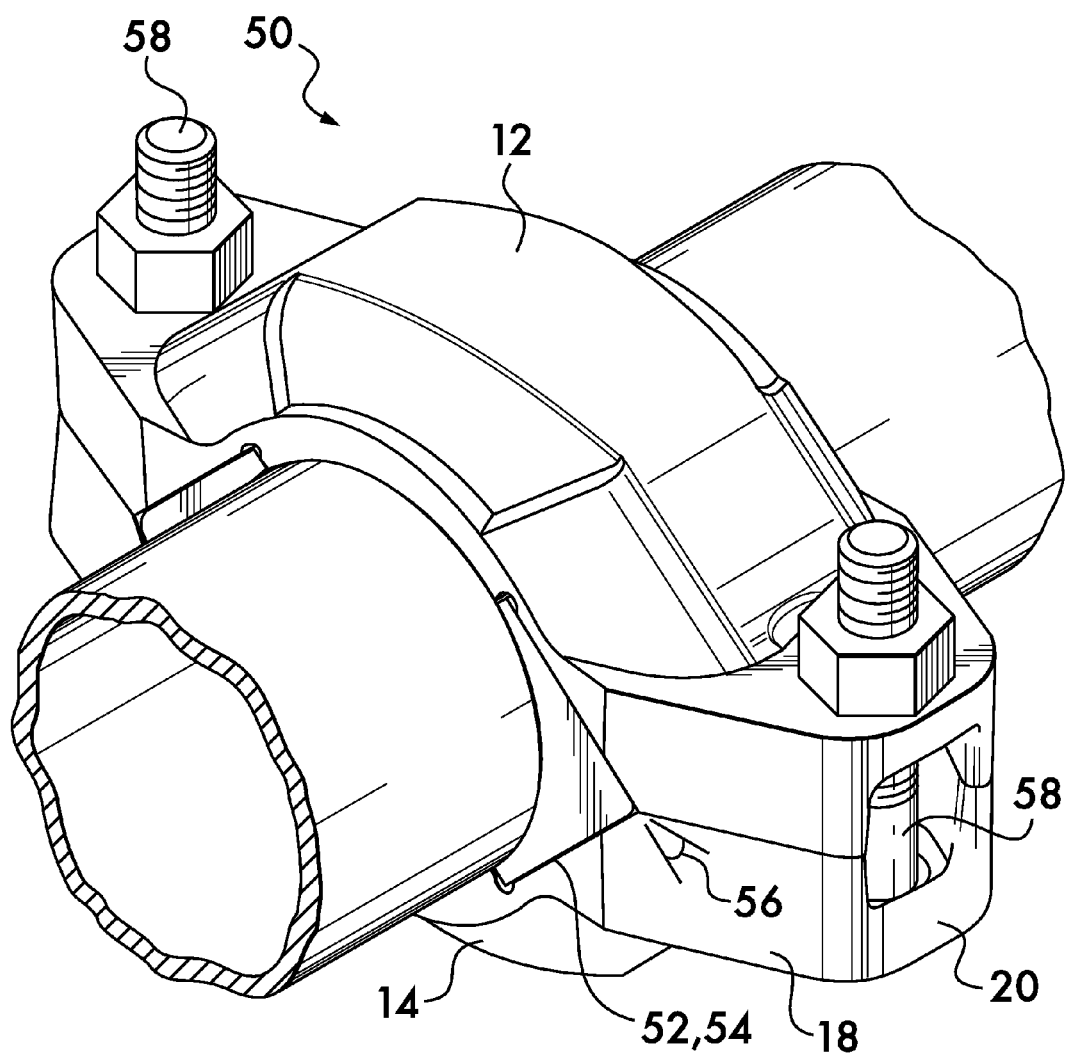
FIG. 8 is an isometric view of the coupling shown in FIG. 5.

FIG. 5 shows an isometric exploded view of another coupling embodiment 50 according to the invention. Coupling 50 has gripping bodies 36 and 38 with contact surfaces 52 positioned on opposite sides of the gripping bodies. Again, the contact surfaces are angularly oriented with respect to the connection members 18 and interface with reaction surfaces 54 positioned on the connection members 18. Orientation angles 56 for the contact surfaces from about 30° to about 60° are advantageous for this coupling design. It is preferred that the orientation angle of the reaction surfaces 54 be approximately the same as the contact surfaces as shown in FIG. 8.

Upon assembly of the coupling 50, a seal 5+ is captured within the central space 16 by the segments 12 and 14 and the gripping bodies 36 and 38. Seal 46 ensures that the coupling 50 provides a fluid-tight joint between pipe ends. The seal is sized so that, in an underformed state, its outer circumference 48 supports the segments 12 and 14 and the gripping bodies 36 and 38 in spaced apart relation sufficient for pipe elements to be inserted into the coupling without disassembling the coupling.

Figure 6:
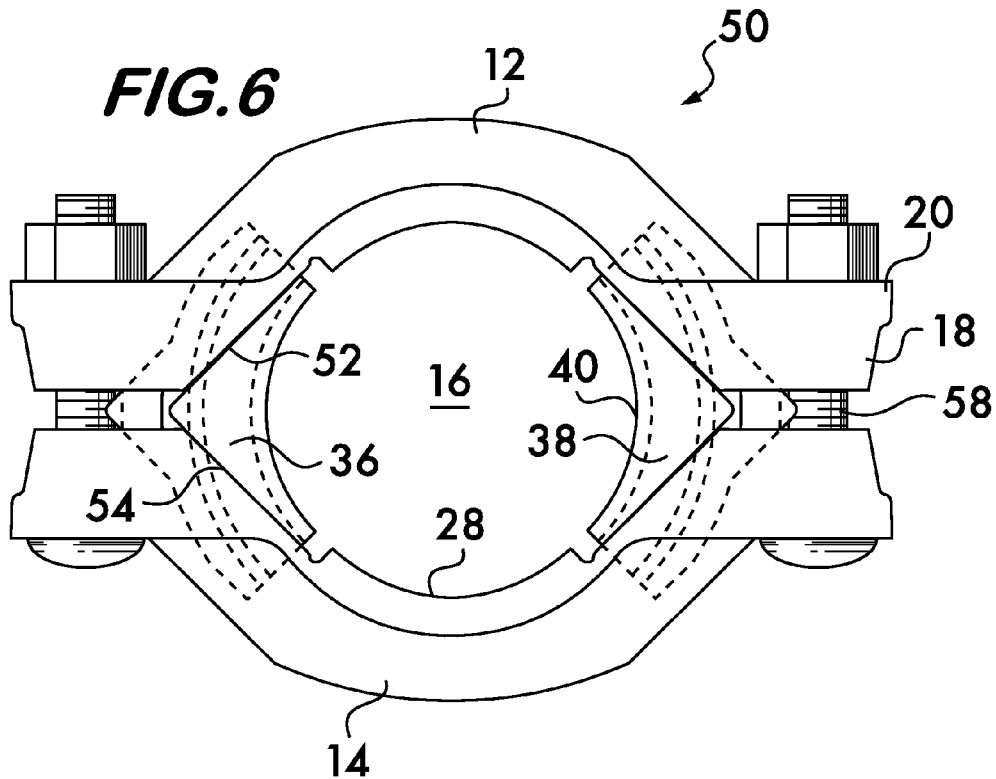
FIGS. 6 and 7 are elevational views of the coupling shown in FIG. 5.
Figure 7:
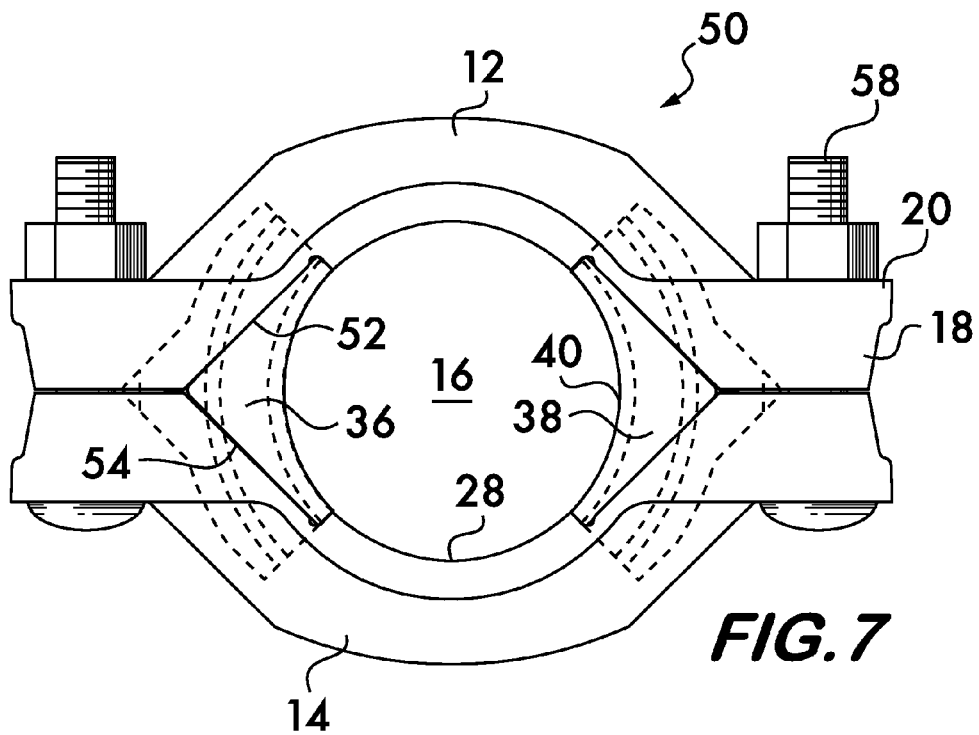

Operation of coupling 50 is similar to that of coupling 10 described above. As shown in FIG. 6, before tightening of fasteners 58 the segments 12 and 14 and the gripping bodies 36 and 38 are spaced outwardly away from the central space 16 so as to allow a pipe element to be inserted into the central space. Tightening of the fasteners as shown in FIG. 7 draws the segments 12 and 14 toward one another and the central space, allowing the arcuate surfaces 28 to engage the pipe elements' outer surface. Interaction between the contact surfaces 52 on the gripping bodies 36 and 38 and the reaction surfaces 54 on the segments 12 and 14 forces the gripping bodies to move inwardly toward the central space as the fasteners 58 are tightened. The inward motion of the gripping bodies allows their gripping surfaces 40 to engage the pipe elements 30 as shown in FIG. 8.

FIG. 9 shows an exploded view of another coupling embodiment 60 according to the invention. Coupling 60 comprises coupling segments 12 and 14. The segments are arranged in facing relation and are joined end-to-end by connection members 18 positioned at opposite ends of each segment. In this embodiment, as with those previously described, the connection members comprise outwardly extending projections 20 which receive fasteners 58 that are adjustably tightenable. Tightening of the fasteners draws the coupling segments 12 and 14 toward one another and the central space 16.

Each segment has inwardly facing arcuate surfaces 28 positioned in spaced relation to one another. The arcuate surfaces occupy positions between the ends of each segment. Reaction surfaces 32 are positioned in spaced relation at opposite ends of each coupling segment 12 and 14. The reaction surfaces face inwardly toward the central space 16 and extend in a tangential direction around the segments. The reaction surfaces are angularly oriented as described below.

Figure 11:
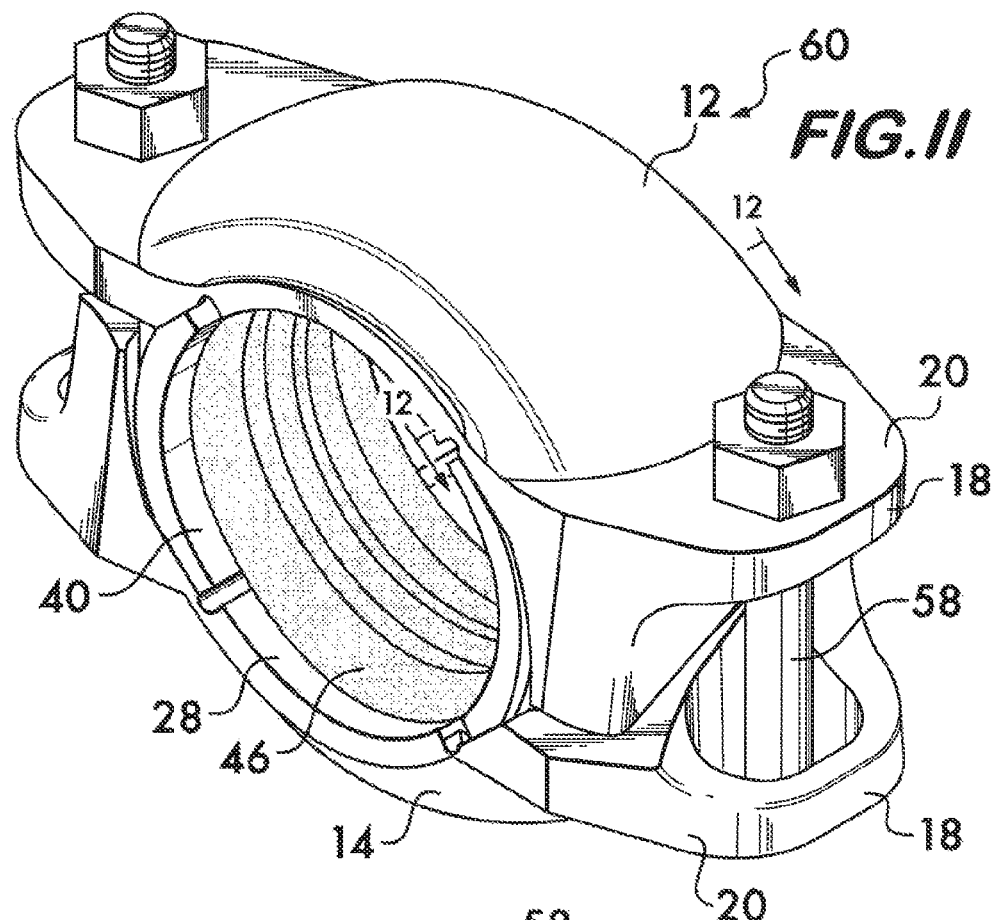
FIG. 11 is an isometric view of the coupling shown in FIG. 9.

Gripping bodies 36 and 38 are positioned between the segments 12 and 14 at opposite ends of the coupling 60. Each gripping body has inwardly facing gripping surfaces 40 arranged in spaced relation. Preferably, the gripping surfaces 40 align with respective arcuate surfaces 28 when the coupling is assembled as best shown in FIG. 11. With reference again to FIG. 9, each gripping body has contact surfaces 42 in spaced relation. Contact surfaces 42 face outwardly away from the central space 16 and engage respective reaction surfaces 32 on the segments 12 and 14. The contact surfaces on the gripping bodies cooperate with the reaction surfaces on the segments such that, when the segments are drawn toward one another, for example, by the tightening of fasteners 58, the gripping bodies are urged radially inwardly as explained further below.

A seal 46 is positioned between the coupling segments 12 and 14 and the gripping bodies 36 and 38, Both the segments and gripping bodies have respective channels 62 and 64 positioned between the arcuate surfaces 28 and the gripping surfaces 40 which receive the seal. The inner circumference 66 of the seal 46 has inwardly facing sealing surfaces 68 and 70 which engage pipe elements joined by the coupling to form a fluid-tight seal. The seal 46 is sized so that, in an undeformed state, its outer circumference 72 supports the segments 12 and 14 and the gripping bodies 36 and 38 in spaced apart relation sufficient for pipe elements to be inserted into the central space 16 without disassembling the coupling. Preferably, the sealing member is a ring formed of an elastic, resilient material such as EPDM elastomer which deforms when the coupling segments are drawn toward one another by adjustably tightening the connection members 18.

Figure 12:
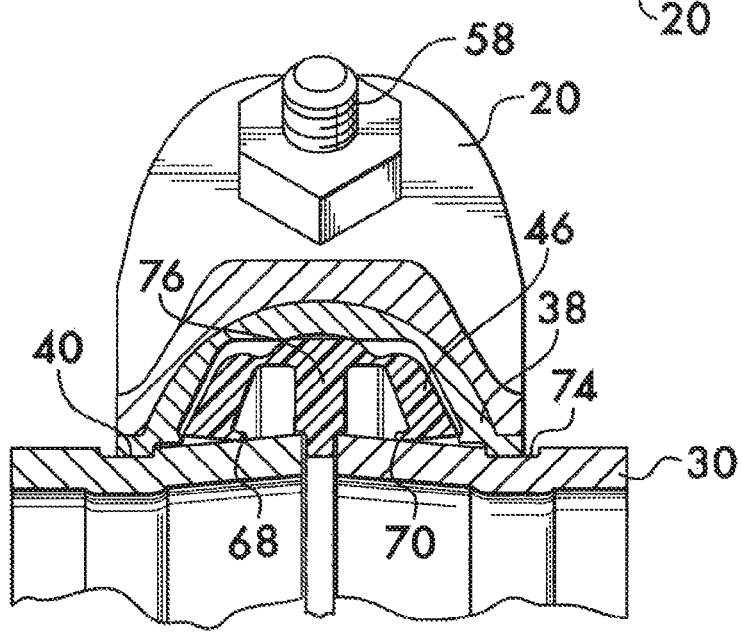
FIG. 12 is a sectional view taken at line 12-12 of FIG. 11.

FIG. 11 shows the pipe coupling 60 in its pre-assembled state ready for use. To effect a fluid-tight joint connecting pipe elements in end-to-end relation, pipe elements 30 are inserted into the sealing member 46 as shown in FIG. 12, so that the segments straddle facing end portions of the pipe elements. The pipe elements are inserted to an extent such that grooves 74 in the outer surfaces of the pipe elements align with the arcuate surfaces of the segments (not shown) and the gripping surfaces 40 of the gripping bodies 36 and 38. Insertion of the pipe elements to the proper depth may be facilitated by a pipe stop 76 positioned on the sealing member between the sealing surfaces 68 and 70. The pipe stop projects inwardly to engage the ends of the pipe elements and limit the insertion depth as desired.

Figure 13:
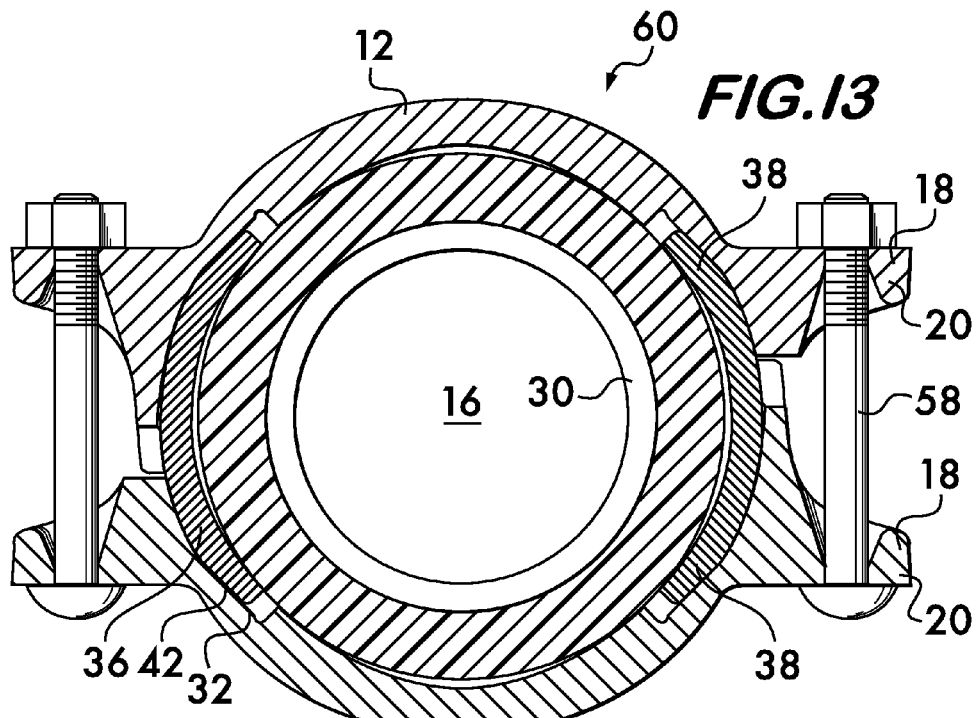
FIGS. 13 and 14 are sectional views of the coupling shown in FIG. 9.
Figure 14:
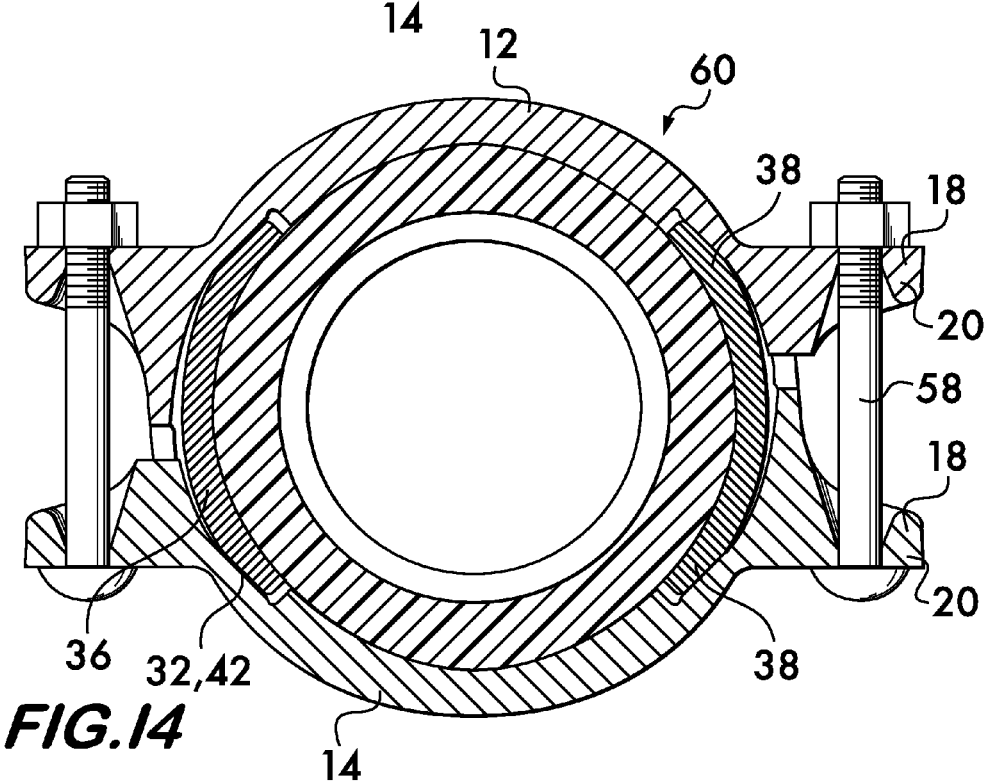

FIG. 13 shows a cross-sectional view of the coupling 60 with pipe element 30 inserted. Attention is drawn to the reaction surfaces 32 on segments 12 and 14 engaging the contact surfaces 42 on gripping bodies 36 and 38. The reaction surfaces are angularly oriented so that when the fasteners 58 are tightened, drawing the segments 12 and 14 toward one another as shown in FIG. 14, the gripping bodies 36 and 38 are moved radially inwardly so that the gripping surfaces on the gripping bodies engage and grip the grooves 74 of the pipe elements 30 shown in FIG. 12. The motion of the segments 12 and 14 toward one another also causes the arcuate surfaces 28 (not shown) on each segment to engage and grip the grooves as well. The pipe elements are, thus, secured in end-to-end relation. The sealing member is deformed radially inwardly to force the sealing surfaces 68 and 70 into further engagement with the outer surfaces of the pipe elements. This configuration produces a relatively rigid joint. A more flexible joint can alternately be provided if the motion of the arcuate surfaces is limited so that they do not engage and clamp the floor of the groove. To this end, the travel of the gripping bodies is limited by the extent or length of the reaction surfaces and the contact surfaces. Limitation of motion of the arcuate surfaces on the segments toward the central space is preferably controlled by limiting the motion of the segments through contact of the connection members 18.

As noted, the coupling embodiment 60 provides a substantially rigid joint for the pipe elements, i.e., the joint has significant stiffness about all three axes (bending, axial extension and torsion) to prevent significant angular deflection as well as axial movement (compression and extension) of the pipe elements relatively to one another. Torsional deflections are also inhibited. The rigidity of the joint is effected by the angularly oriented surfaces 78 and 80 positioned on each segment 12 and 14 adjacent to the connection members 18 as best shown in FIG. 9. The surfaces 78 and 80 on each segment have opposite slopes and are in facing relation with the angularly oriented surfaces on the adjoining segment. When the segments 12 and 14 are drawn toward one another by tightening of fasteners 58, the angularly oriented surfaces on each segment engage one another and force the segments to rotate in opposite directions about an axis 82, perpendicular to the pipe elements joined by the coupling. The rotation of the segments causes the arcuate surfaces 28 to forcibly engage the sidewalls of the grooves in the pipe elements and stiffen the joint, as described in U.S. Pat. Nos. 4,611,839, 4,639,020 and 5,758,907 hereby incorporated by reference.

To further enhance the rigidity of the joint between pipe elements formed by coupling 60, the gripping bodies 36 and 38 may be designed as shown in FIG. 9 such that their end faces 84 and 86 are angularly oriented relative to the gripping surfaces 40. The angular orientation is best shown in FIG. 10 for gripping body 36 which takes on a rhomboidal profile as a result. The end faces 84 and 86 engage inwardly projecting shoulders 88 on each segment 12 and 14 as the segments are drawn toward one another when forming a joint. The angular orientation of the end faces causes the gripping bodies 36 and 38 to rotate in opposite directions about an axis 90 as they are brought into contact with the shoulders 88. Axis 90 is substantially perpendicular to the pipe elements being joined by the coupling segments 12 and 14. The rotation of the gripping bodies causes the gripping surfaces 40 thereon to rotate and forcibly engage the sidewalls of the grooves in the pipe elements similar to the arcuate surfaces on the segments. To avoid rotationally deforming the seal 46, the channels 64 in each gripping body are skewed in the opposite direction of rotation so that, when the gripping elements rotate about axis 90, the channels 64 will align with the sealing members so that essentially only radial compression results, i.e., there is no significant twisting of the sealing member about axis 90.

It is further observed that the angular orientation of the end faces 84 and 86 causes rotation of the segments 12 and 14 about axis 82, thereby rendering the sloped surfaces 78 and 80 optional, and useful to enhance the rotation of the segments if necessary.

Figure 15:
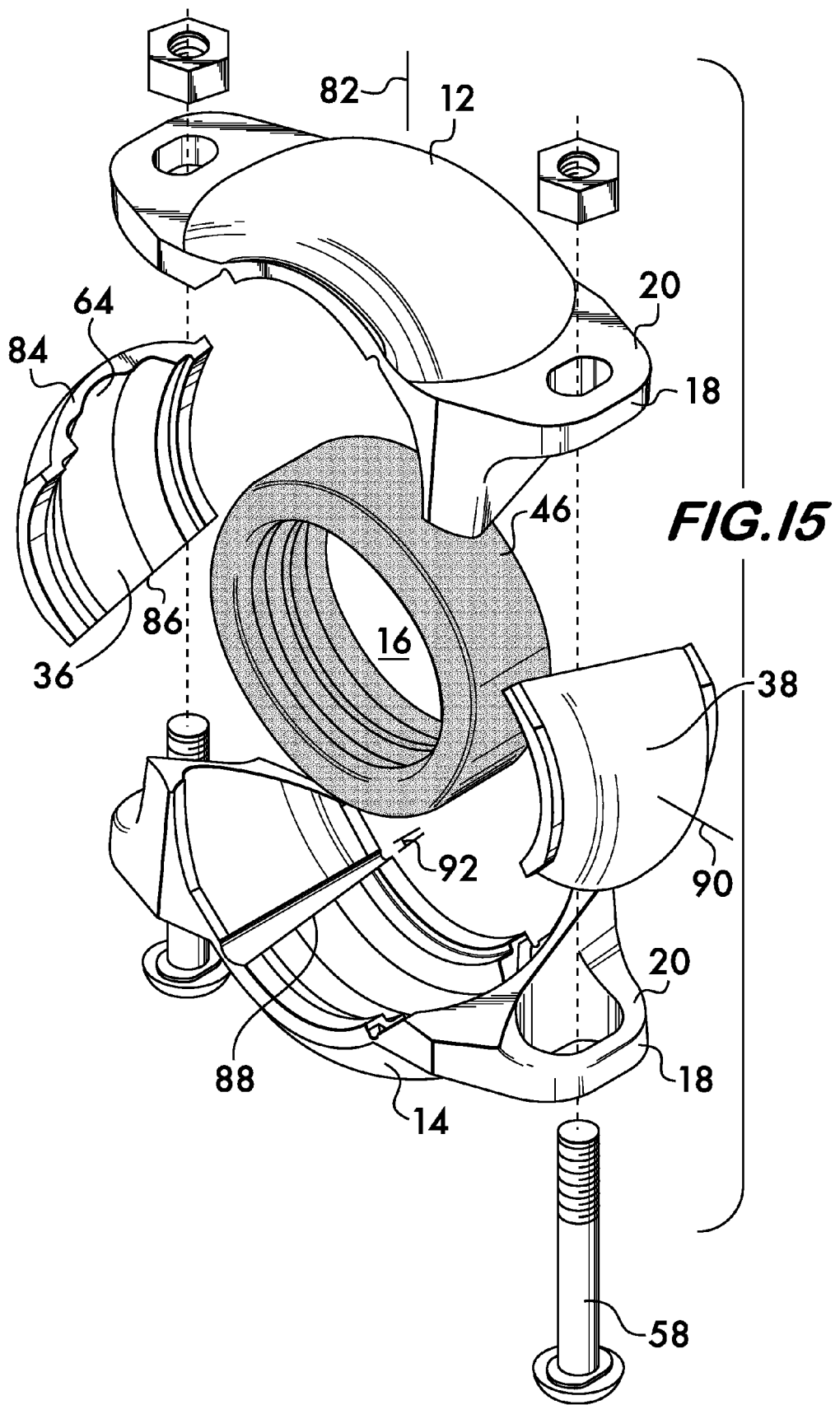
FIG. 15 is an exploded view of another embodiment of the coupling according to the invention.

Rotation of the gripping bodies 36 and 38 about axis 90 may also be achieved by angularly orienting the inwardly projecting shoulders 88 as shown in FIG. 15, the orientation angle 92 of the shoulder forcing rotation of the gripping bodies as the segments 12 and 14 are drawn together, forcing engagement between the shoulders 88 and the end faces 84 and 86 of the gripping bodies. It is also possible to combine the features of FIGS. 9 and 15 and have both the end faces 84 and 86 angularly oriented as well as the shoulders 88.

It is also feasible to provide angularly oriented surfaces on each segment which have opposite slopes. Such couplings will also provide a rigid joint, but the interaction of the surfaces causes the couplings to slide in opposite directions and thereby engage the sidewalls of the grooves. If it is desired to allow some degree of bending flexibility to the joint, the surfaces adjacent to the connection members are made with no slope, i.e., substantially flat.

Figure 16:
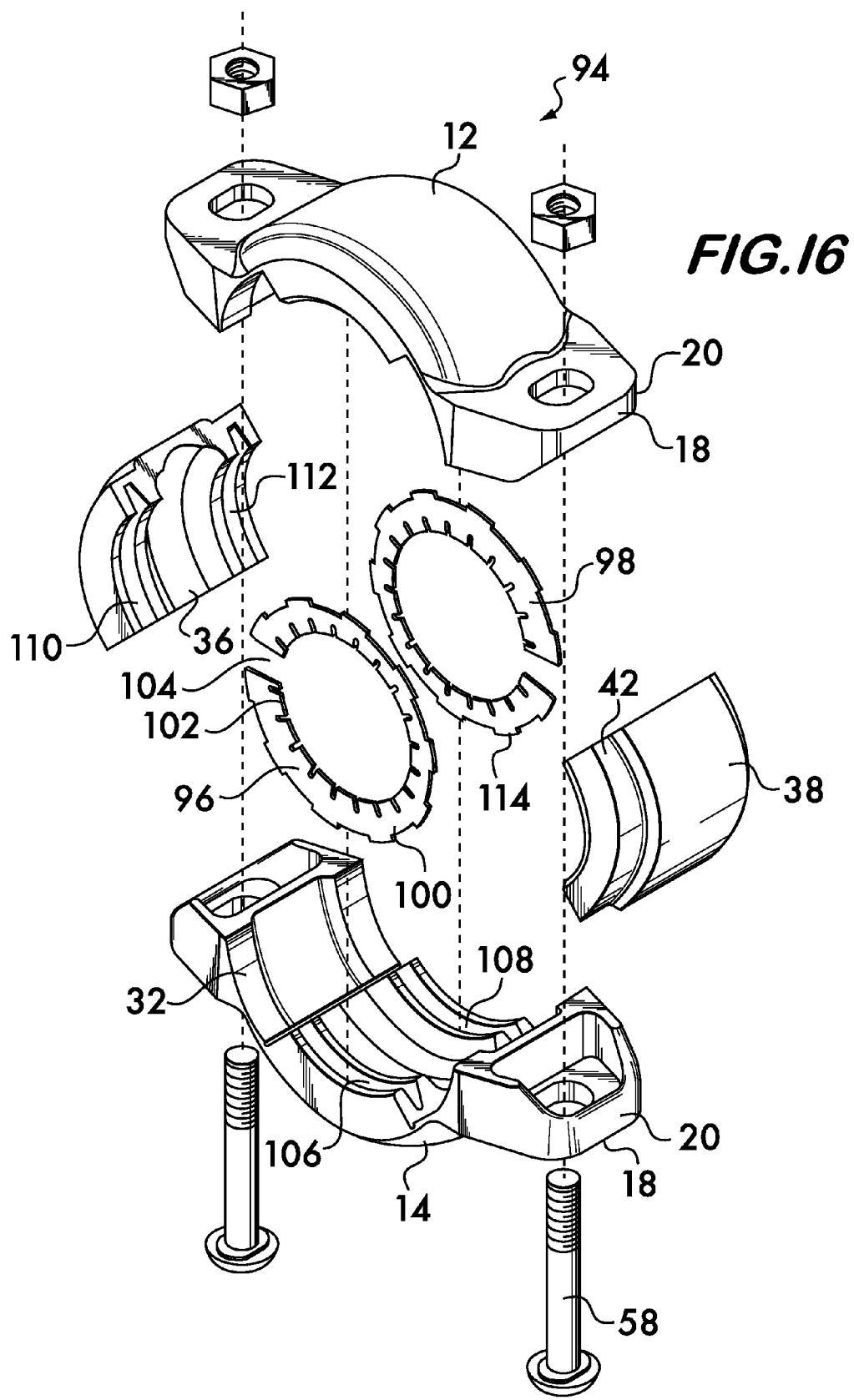
FIG. 16 is an exploded view of another embodiment of the coupling according to the invention.

FIG. 16 shows an exploded view of another coupling embodiment 94 according to the invention. Coupling 94 is used to couple plain end pipe elements together, i.e., pipes having no grooves, beads, enlargements or other features near the ends to facilitate engagement with the coupling. Many of the components of this embodiment are similar to coupling 60 and will not be described in detail. Note also that the sealing member 46 shown in FIG. 1 is not shown in FIG. 6 for clarity, although the same or a similar sealing member is also used with coupling 94.

To enable the coupling 94 to grip plain end pipe elements, two retainers 96 and 98 are used. Each retainer comprises an annular band 100 which has a plurality of flexible, resilient teeth 102. The teeth project radially inwardly for engagement with the pipe elements as described below. The teeth are also angularly oriented out of the plane of the band 100, with the teeth on retainer 96 being angled toward the teeth on retainer 98 and vice versa. The angular orientation of the teeth allows the pipe elements to be inserted into the coupling, but prevents the pipe elements from being withdrawn when the teeth forcibly engage the pipe elements as described below. Band 100 is split, as evidenced by the gap 104. This gap permits the band to be compressed radially to allow the teeth to engage the pipe elements.

Figure 17:
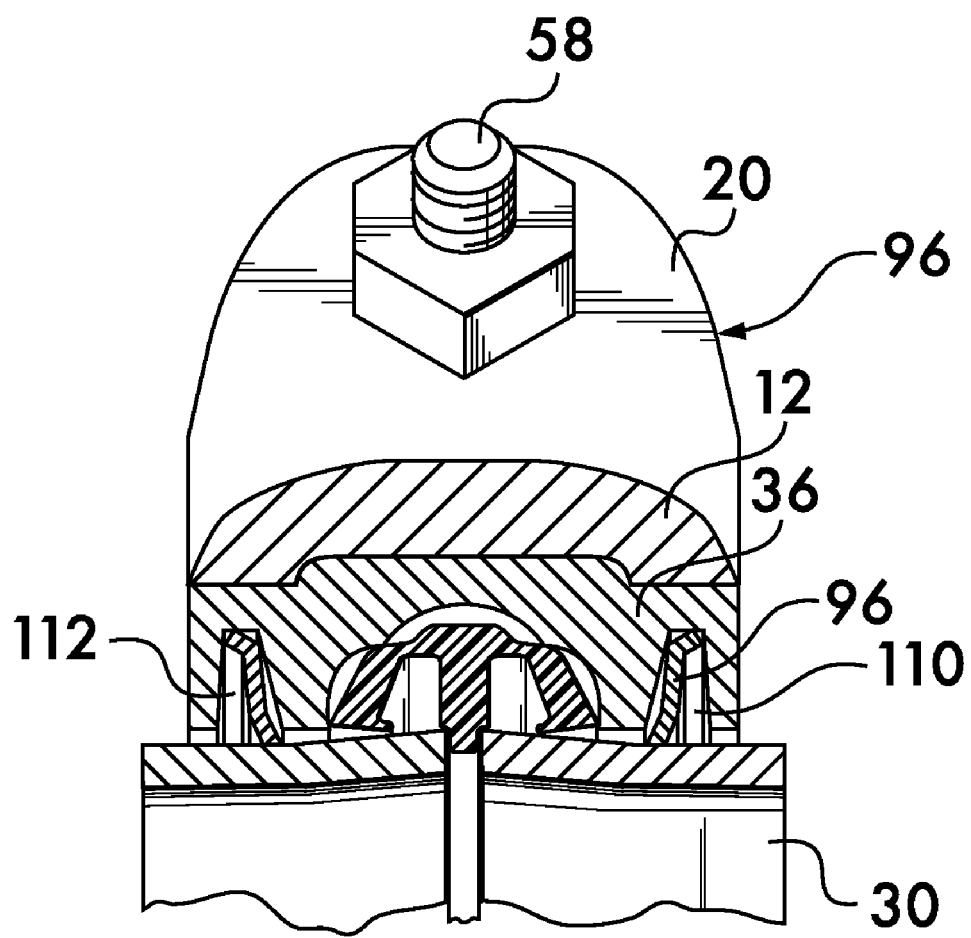
FIG. 17 is a sectional view of a portion of the coupling shown in FIG. 16.

The retainers are received within grooves 106 and 108 in segments 12 and 14 and grooves 110 and 112 in the gripping bodies 36 and 38. Preferably, when assembled, the grooves in the segments align with the grooves in the gripping bodies. As shown with reference to FIGS. 16 and 17, when the pipe elements 30 are inserted into the coupling 94 and the fasteners 58 are tightened, the segments 12 and 14 are drawn together and the gripping bodies 36 and 38 move inwardly in response to the interaction of the reaction surfaces 32 with the contact surfaces 42. The inward motion of the grooves 106, 108, 110 and 112 compresses the bands 100 of retainers 96 and 98 inwardly so that teeth 102 engage the surfaces of pipe elements 30. Because the teeth are angled they deflect inwardly and permit the pipe elements to be inserted into the coupling. But when force is applied which tends to remove the pipe elements from the coupling, the teeth prevent this motion due to the self-jamming characteristics of the angled teeth.

Retainers 96 and 98 preferably have a plurality of tabs 114 which project outwardly from the band 100. As shown in FIG. 16, the tabs engage the grooves 106 and 108 of the segments as well as grooves 110 and 112 of the gripping bodies and provide a degree of radial flexibility to the retainer. This added flexibility permits the segments to be joined in what is known as "pad-to-pad" relation wherein the connection members 18 on the segments abut one another when the fasteners 58 are tightened in spite of dimensional variations in the segments and pipes. It is advantageous that the segments join pad-to-pad as it provides a readily identifiable visual indication that the fasteners are fully tightened and thereby avoids the need for torquing the fasteners to a particular value as proof of completion of a fluid-tight joint. Avoiding the need for torque measurements simplifies installation of the coupling, as a torque wrench is not necessary.

Couplings according to the invention realize an advantage through the use of the moving gripping bodies which allows them to be installed from the pre-assembled state easily using hand tools. The movable gripping bodies reduce the torque required to bring the segments together and grip the pipe elements to effect a fluid-tight joint.

What is claimed is:

1. A pipe coupling for securing end portions of a pair of pipe elements together end-to-end, said coupling comprising:
   a plurality of segments connectable end-to-end surrounding a central space for receiving said pipe elements, each said segment having a pair of arcuate surfaces in spaced relation, said arcuate surfaces facing said central space and being engagable with said pipe elements;
   connection members positioned at opposite ends of each of said segments for adjustably connecting said segments to one another, said connection members being adjustably tightenable for drawing said coupling segments toward one another and into engagement with said pipe elements;
   first and second reaction surfaces positioned at opposite ends of each said coupling segment in spaced relation, said reaction surfaces facing said central space;
   first and second gripping bodies being positioned between said segments at opposite ends thereof, each of said gripping bodies having a pair of gripping surfaces positioned in spaced relation facing said central space, said gripping surfaces being engagable with said pipe elements, each of said gripping bodies having a plurality of contact surfaces positioned in spaced relation, each of said contact surfaces being engaged with one of said reaction surfaces of said segments, each of said gripping bodies having end faces positioned opposite to one another, said segments having inwardly projecting shoulders positioned adjacent to said reaction surfaces, said shoulders being engagable with said end faces, at least one of said end faces or said shoulders being angularly oriented so as to cause rotation of said gripping bodies about an axis substantially perpendicular to said pipe elements when said coupling segments are drawn together; and
   wherein adjustable tightening of said connection members draws said coupling segments together, said contact surfaces interacting with said reaction surfaces to move said gripping bodies radially inwardly for engagement of said gripping surfaces with said pipe elements.

2. A pipe coupling according to claim 1, wherein said reaction surfaces extend in a tangential direction of said segments.

3. A pipe coupling according to claim 1, further comprising a sealing member captured between said segments and positioned between said arcuate surfaces, said sealing member having inwardly facing sealing surfaces engagable with said pipe elements for forming a fluid-tight joint between said pipe elements.

4. A pipe coupling according to claim 3, wherein said sealing member comprises an outer circumference sized to support said segments and said gripping bodies in spaced apart relation sufficient for pipe elements to be inserted into said central space without disassembling said coupling.

5. A pipe coupling according to claim 1, wherein said connection members comprise a pair of projections extending outwardly from the ends of each of said segments, said projections being adapted to receive fasteners for adjustably connecting said segments to one another, said fasteners being adjustably tightenable for drawing said arcuate surfaces of said segments into engagement with said pipe elements.

6. A pipe coupling according to claim 1, wherein said segments further comprise a pair of angularly oriented surfaces positioned adjacent to each of said connection members, said angularly oriented surfaces on each of said segments having opposite slopes, said angularly oriented surfaces on one said segment being in facing relation with said angularly oriented surfaces on another said segment, said angularly oriented segments engaging one another when said segments are drawn together and causing said segments to rotate relatively to one another about an axis substantially perpendicular to said pipe elements.

7. A pipe coupling according to claim 1, wherein said gripping bodies comprise a channel adapted to receive a sealing member, said channel being skewed relatively to said gripping surfaces so as to substantially align with said sealing member upon rotation of said gripping bodies.

8. A pipe coupling according to claim 1, wherein said at least one end face is angularly oriented with respect to said gripping surfaces.

9. A pipe coupling according to claim 1, wherein said at least one shoulder is angularly oriented with respect to said arcuate surfaces.

10. A pipe coupling for securing end portions of a pair of pipe elements together end-to-end, said coupling comprising:
a pair of segments connectable end-to-end surrounding a central space for receiving said pipe elements, each said segment having a pair of arcuate surfaces in spaced relation, said arcuate surfaces facing said central space and being engagable with said pipe elements;
first and second connection members positioned at opposite ends of each of said segments for adjustably connecting said segments to one another, said connection members being adjustably tightenable for drawing said segments toward one another and into engagement with said pipe elements;
first and second pairs of reaction surfaces positioned at opposite ends of each of said segments, said reaction surfaces of each said pair being arranged in spaced relation to one another, said reaction surfaces facing said central space;
first and second gripping bodies positioned between said segments at opposite ends thereof, each of said gripping bodies having a pair of gripping surfaces positioned in spaced relation facing said central space, said gripping surfaces being engagable with said pipe elements, each of said gripping bodies having first and second pairs of contact surfaces, said contact surfaces of each said pair being arranged in spaced relation to one another, each of said contact surfaces being engaged with a respective one of said reaction surfaces of said segments, each of said gripping bodies having end faces positioned opposite to one another, each of said segments having a pair of inwardly projecting shoulders, each said shoulder being positioned adjacent to one of said reaction surfaces, said shoulders being engagable with said end faces, at least one of said end faces or said shoulders being angularly oriented so as to cause rotation of said gripping bodies about an axis substantially perpendicular to said pipe elements when said coupling segments are drawn together; and
wherein adjustable tightening of said connection members draws said coupling segments together, said contact surfaces interacting with said reaction surfaces to move said gripping bodies radially inwardly for engagement of said gripping surfaces with said pipe elements.

11. A pipe coupling according to claim 10, wherein said reaction surfaces extend in a tangential direction of said segments.

12. A pipe coupling according to claim 10, further comprising a sealing member captured between said segments and positioned between said arcuate surfaces, said sealing member having inwardly facing sealing surfaces engagable with said pipe elements for forming a fluid-tight joint between said pipe elements.

13. A pipe coupling according to claim 12, wherein said sealing member comprises an outer circumference sized to support said segments and said gripping bodies in spaced apart relation sufficient for pipe elements to be inserted into said central space without disassembling said coupling.

14. A pipe coupling according to claim 10, wherein each of said connection members comprises a projection extending outwardly from a respective end of each of said segments, said projections being adapted to receive fasteners for adjustably connecting said segments to one another, said fasteners being adjustably tightenable for drawing said arcuate surfaces of said segments into engagement with said pipe elements.

15. A pipe coupling according to claim 10, wherein each of said segments further comprises a pair of angularly oriented surfaces positioned adjacent to each of said connection members, said angularly oriented surfaces on each of said segments having opposite slopes, said angularly oriented surfaces on one said segment of said pair being in facing relation with said angularly oriented surfaces on the other said segment of said pair, said angularly oriented segments engaging one another when said segments are drawn together and causing said segments to rotate relatively to one another about an axis substantially perpendicular to said pipe elements.

16. A pipe coupling according to claim 10, wherein said gripping bodies comprise a channel adapted to receive a sealing member, said channel being skewed relatively to said gripping surfaces so as to substantially align with said sealing member upon rotation of said gripping bodies.

17. A pipe coupling according to claim 10, wherein said end faces are angularly oriented with respect to said gripping surfaces.

18. A pipe coupling according to claim 10, wherein said shoulders are angularly oriented with respect to said arcuate surfaces.

* * * * *